US005093774A

United States Patent [19]

Cobb

[11] Patent Number: 5,093,774

[45] Date of Patent: Mar. 3, 1992

[54] TWO-TERMINAL SERIES-CONNECTED NETWORK

[75] Inventor: Thomas F. Cobb, Oxford, Conn.

[73] Assignee: Thomas & Betts Corporation, Bridgewater, N.J.

[21] Appl. No.: 673,714

[22] Filed: Mar. 22, 1991

[51] Int. Cl.[5] .......... H01G 1/14; H01G 4/10

[52] U.S. Cl. .......... 361/306; 361/321

[58] Field of Search .......... 361/306, 320, 321, 275, 361/534, 530, 538, 540, 539

[56] References Cited

U.S. PATENT DOCUMENTS 2,828,454 3/1958 Khouri .......... 361/321
3,496,435 2/1970 Manley .......... 361/301
4,193,106 3/1980 Coleman .......... 361/275
4,458,294 7/1984 Womack .......... 361/321
4,847,730 7/1989 Konno et al. .......... 361/306

FOREIGN PATENT DOCUMENTS 3125281 7/1983 Fed. Rep. of Germany .

*Primary Examiner*—Donald A. Griffin
*Attorney, Agent, or Firm*—Robert M. Rodrick; Salvatore J. Abbruzzese

[57] ABSTRACT

An integrated series-connected network is achieved in two-terminal format by providing a multilayer ceramic capacitor in which one set of electrodes is connected directly to one terminal of the network while the second set of electrodes is joined to an end of a resistor or an inductor and the other end of the resistor or inductor is joined to the other terminal of the network.

5 Claims, 1 Drawing Sheet

10 20 30 32 34 34 40 50 52 54 56 60 62 64 66 70 72 74 76

TWO-TERMINAL SERIES-CONNECTED NETWORK

FIELD OF THE INVENTION

This invention relates to series-connected networks, and more particularly to such a network integrated into a surface mounted component having only two terminals.

BACKGROUND OF THE INVENTION

Prior art components having a network including a capacitor integrated with a resistor or inductor traditionally have been constructed by uniting the inductor or resistor in parallel connection with a multilayer ceramic capacitor. The prior art parallel construction has been facilitated by connecting one terminal of the capacitor to one terminal of the inductor or resistor, and the other terminal of the capacitor to the other terminal of the inductor or resistor.

Prior art series-connected circuits have required more complex constructions employing three terminal networks wherein one end of the capacitor is connected to one end of the inductor or resistor, while the other end of the capacitor and the other end of the inductor or resistor are each provided with its own terminal.

SUMMARY OF THE INVENTION

It is an object of this invention to provide a two-terminal series-connected network. Another object is the provision of a surface mounted construction having two exposed terminals for a series-connected network.

In accordance with the preferred form of the invention, a two-terminal series-connected network is provided by a multilayer ceramic capacitor in which one set of interdigitated electrodes is connected to one terminal of the network while the other set of interdigitated capacitor electrodes is connected to one end of an inductor or resistor whose other end is connected to the second terminal of the network. An overglaze is employed to encase the capacitor and the inductor or resistor so as to leave the two terminals exposed for utilization as a surface mount device.

DESCRIPTION OF THE PREFERRED EMBODIMENT

Figure 1:
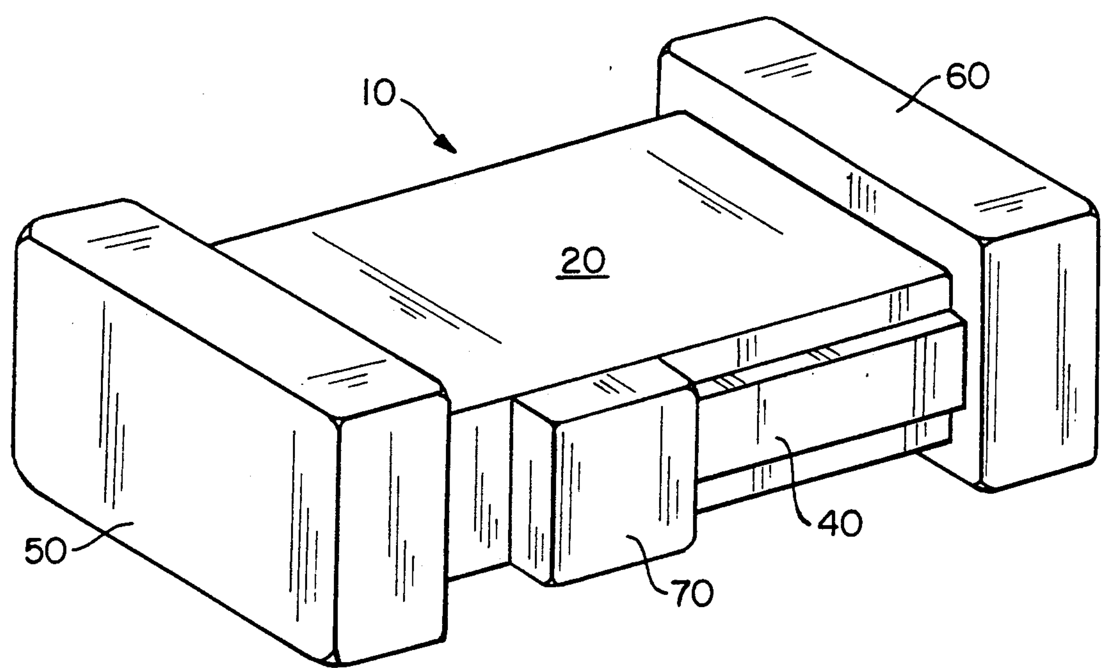
FIG. 1 is a perspective view of the network of the present invention showing the exposed terminations at the ends of the device with the body between the terminations being overglazed.
Figure 2:
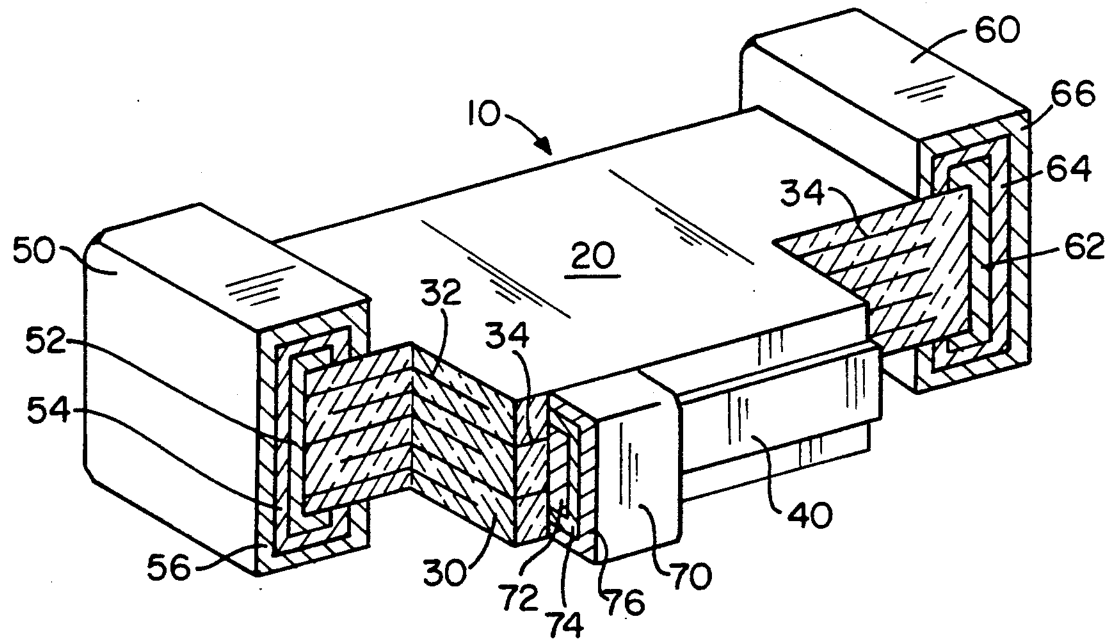
FIG. 2 is a perspective view of the device of FIG. 1 having cutaway portions to show the interrelationship of the members of the network.

Drawing FIGS. 1 and 2 show a network 10 having a body portion 20 disposed between two exposed terminations 50 and 60. Body portion 20 includes a capacitor 30 and another functional device 40 which are interconnected at terminations 60 and 70.

Capacitor 30 is a multilayer ceramic capacitor having alternating electrode layers 32 and 34 which are interdigitated with all layers 32 being interconnected at termination 50. Alternate electrode layers 34 are all interconnected at termination 70. None of electrodes 32 and 34 is connected to termination 60 which serves instead as the second termination for the series connected network 10.

Functional device 40 is interconnected in series with capacitor 30 at terminations 70 and 60. Device 40 is preferably an inductor or a resistor so as to provide with capacitor 30 an LC network or an RC network having terminations 50 and 60. Device 40 is interconnected in series with capacitor 30 at termination 70 by having one end of device 40 connected to electrodes 34 and the other end of device 40 being connected by itself to termination 60.

The internal construction of multilayer capacitor 30 follows known methods for producing alternate layers of ceramic material and electrode material, which methods are suitable for the requirements of this invention. The electrodes are deposited on ceramic material according to a pattern that exposes alternate electrodes such that the alternate electrode layers are interconnectable at edges of the ceramic stack. Again, in this invention electrodes 32 are interconnectable at termination 50, and electrodes 34 are interconnectable at termination 70, with no electrode connectable at termination 60.

The interconnection of the several electrodes 32 or 34 of either set of electrodes is accomplished by conventionally known methods, such as by dipping the capacitor body into what is commonly called an electrode pick-up ink containing silver and binders. The ink adheres to the exposed edges of electrodes 32 and 34, and is thereafter fixed so as to provide the interconnection of a set of electrodes and the pick-up for further termination practices.

Terminations 50, 60 and 70 are all shown as having three layers, because of the convenience of dipping the capacitor body without having to mask any edges of the capacitor body. The innermost layers 52, 62 and 72 are conventionally protected against any potential damage, e.g. during surface mount soldering into electronic assemblies, by providing barrier layers 54, 64 and 74, preferably of nickel. Outer layers 56, 66 and 76 are preferably formed of tin and are provided to facilitate subsequent soldering processes. These outer terminals may also comprise conventional silver-palladium termination materials.

The functional device 40 is an inductor or a resistor which is deposited on body 20 in connection between terminations 70 and 60 by conventional methods, such as painting on the inductor or by screening the resistor. Proper value of the functional device 40 is achieved by trimming with known device, such as a laser trimmer.

The network component of this invention is completed by the provision of a protective coating, such as a known insulating glass overglaze, which covers the body 20 including termination 70 and which leaves exposed only terminations 50 and 60.

Having described the preferred form of the invention, it should be appreciated that variations may be made thereto without departing from the contemplated scope of the invention. As such, the preferred description is intended to be illustrative rather than limiting. The true scope of the invention is set forth in the claims appended hereto.

I claim:

1. A two-terminal component comprising an integral series-connected network of a multilayer capacitor and another functional device selected from a resistor and an inductor, said component having a ceramic body with a first terminal at one end and a second terminal at another end, one set of interdigitated electrodes of said capacitor buried in said body and connected to said first terminal, the other set of interdigitated electrodes of said capacitor buried in said body and exposed at an edge of said body remote from said first terminal and said second terminal, said another functional device located on said body and connected between said exposed electrodes and said second terminal.

2. The component of claim 1 wherein said other set of electrodes is interconnected at said edge, and said device is joined to said interconnection.

3. The component of claim 1 wherein said network is provided with a protective coating that exposes only said first terminal and said second terminal.

4. The component of claim 1 wherein said first terminal and said second terminal are of multilayer construction with the exposed layer being suitable for surface mount applications.

5. The component of claim 4 wherein said multilayer construction is of three layer construction which includes an inner most layer comprising silver as an electrode pick-up, a middle layer comprising nickel, and an outer conductive mounting layer suitable for solder mounting of said network as a surface mount device.

* * * * *